United States Patent
Tian et al.

(10) Patent No.: US 7,999,657 B2
(45) Date of Patent: Aug. 16, 2011

(54) IMAGE REGISTRATION METHOD FOR IMAGE COMPARISON AND DOCUMENT AUTHENTICATION

(75) Inventors: Yibin Tian, Menlo Park, CA (US); Wei Ming, Cupertino, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 105 days.

(21) Appl. No.: 12/632,059

(22) Filed: Dec. 7, 2009

(65) Prior Publication Data

US 2011/0133887 A1  Jun. 9, 2011

(51) Int. Cl.
*G05B 19/00* (2006.01)
*H04N 1/40* (2006.01)
*G06K 9/00* (2006.01)

(52) U.S. Cl. ....... 340/5.86; 340/5.8; 358/3.28; 382/100; 382/284

(58) Field of Classification Search .......... 340/5.8, 340/5.86; 358/3.28; 382/100, 284
See application file for complete search history.

(56) References Cited

U.S. PATENT DOCUMENTS

| 5,509,692 | A  | * | 4/1996 | Oz ................................. 283/70 |
| 5,521,984 | A  | * | 5/1996 | Denenberg et al. ........... 382/209 |
| 6,883,706 | B2 | * | 4/2005 | Mastie et al. .................. 235/379 |
| 7,251,347 | B2 | * | 7/2007 | Smith ............................ 382/108 |
| 7,936,901 | B2 | * | 5/2011 | Jancke ........................... 382/100 |

* cited by examiner

*Primary Examiner* — Jennifer Mehmood
*Assistant Examiner* — Mark Rushing
(74) *Attorney, Agent, or Firm* — Chen Yoshimura LLP (57) ABSTRACT

A method for authenticating a printed document is disclosed. Barcode stamps are added to an original document image near the corners of the page to act as registration markers. The original document image bearing the barcode stamps is printed and circulated, while the original document image is stored in a database. To authenticate a printed document, the printed document is scanned into a target document image, which is compared to the stored original document image. The barcode stamps are used as registration markers to perform a global image registration. Then, the target image and the original image are divided into multiple sub-images, and local image registration is performed on the sub-images before performing an image comparison. Difference sub-images are generated from the pairs of sub-images, and merged into a global difference image for the purpose of detecting any alterations in the printed document.

18 Claims, 3 Drawing Sheets

IMAGE REGISTRATION METHOD FOR IMAGE COMPARISON AND DOCUMENT AUTHENTICATION

BACKGROUND OF THE INVENTION

1. Field of the Invention

This invention relates to a method for image registration for purpose of document authentication, and in particular, it relates to a method for image registration using barcodes printed on the document as markers.

2. Description of Related Art

A closed-loop process refers to printing an original digital document (which may include text, graphics, images, etc.), using the printed hardcopy of the document such as distributing it, copying it, etc., and then scanning a hardcopy of the document back into digital form. Authenticating a scanned digital document refers to determining whether the scanned document is an authentic copy of the original digital document, i.e., whether the document has been altered while it was in the hardcopy form. Various types of document authentication and alteration detection methods have been proposed. A goal in many document authentication methods is to detect what the alterations (additions, deletions) are. One type of document authentication method performs an image comparison of the scanned document with the original digital document. This is sometimes referred to as a pixel-based alteration detection method. In another type of document authentication method, data representing or relating to the document content are encoded in barcodes, and the barcodes are printed on the document itself to assist in document authentication later.

SUMMARY

The present invention is directed to an image registration method and related apparatus that substantially obviates one or more of the problems due to limitations and disadvantages of the related art.

An object of the present invention is to provide an image registration method useful in document authentication by image comparison.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method implemented in a data processing system, which includes: (a) generating an electronic original document image based on a source document, wherein the original document image includes an image representing the source document and at least three alignment markers, wherein each alignment marker is a barcode stamp and is located within a predefined distance from a corresponding one of at least three corners of a boundary of the original document image; (b) storing the original document image in a database; (c) printing the original document image to generate a printed document, whereby the printed document bears the at least three alignment markers; (d) obtaining an electronic target document image from the printed document or a copy thereof, whereby the target document image contains the at least three alignment markers; (e) extracting document management information from the target document image, the document management information specifying a location within the database where the original document image is stored; (f) retrieving the original document image from the database based on the extracted document management information; (g) obtaining positions of the at least three alignment markers in the target document image; (h) obtaining positions of the at least three alignment markers in the original document image; (i) calculating a global mapping function between the original document image and the target document image using the positions of the alignment markers in the original document image and the target document image; and (j) calculating an aligned target document image using the target document image and the mapping function.

In another aspect, the present invention provides a method for authenticating a printed document, the printed document containing at least three alignment markers, the method including: (a) obtaining an electronic target document image from the printed document, whereby the target document image contains the at least three alignment markers; (b) extracting document management information from the target document image, the document management information specifying a location within a database where an original document image corresponding to the target document image is stored; (c) retrieving the original document image from the database based on the extracted document management information, wherein the original document image contains at least three alignment markers corresponding to the at least three alignment markers in the target document image; (d) obtaining positions of the at least three alignment markers in the target document image; (e) obtaining positions of the at least three alignment markers in the original document image; (f) calculating a global mapping function between the original document image and the target document image using the positions of the alignment markers in the original document image and the target document image; and (g) calculating an aligned target document image using the target document image and the mapping function; (h) binarizing the original document image and the aligned target document image to generate a binarized original document image and a binarized target document image; (i) dividing the binarized original document image into a plurality of original sub-images and dividing the binarized target document image into a plurality of target sub-images corresponding to the plurality of original sub-images; (j) for each original sub-image and the corresponding target sub-image, (j1) aligning the target sub-image to the original sub-image to generate an aligned target sub-image; and (j2) calculating a difference sub-image representing differences between the aligned target sub-image and the original sub-image; and (k) merging the difference sub-images to generate a global difference image representing differences between the target document image and the original document image.

In another aspect, the present invention provides a computer program product that causes a data processing apparatus to perform the above methods.

It is to be understood that both the foregoing general description and the following detailed description are exemplary and explanatory and are intended to provide further explanation of the invention as claimed.

DETAILED DESCRIPTION OF PREFERRED EMBODIMENTS

In a closed-loop print-and-scan process, to perform a pixel-based alteration detection method, an image (such as a binary bitmap image) of a scanned hardcopy document (referred to as the target image) is compared with an image of the original document (referred to as the original image). The target image typically contains various distortions due to the hardcopy document having been copied, as well as due to the scanning process. The distortions may include scaling (magnification/reduction), rotation, and/or shift of the image. Thus, the target image needs to be corrected for these distortions before the image comparison. This process may be referred to as image registration or alignment. Correction for scaling distortion is also referred to as resizing; correction for rotation distortion is also referred to as deskew.

Embodiments of the present invention provide a method in which barcode stamps are used for image registration. Many printed documents already carry various barcode stamps to encode information useful for document authentication or document management. Document authentication information may include compressed data representing content of the document. Document management information may include information regarding the creation date, the author, etc. of the document, a document ID, where an electronic version of the document is stored in an electronic database, etc. The barcodes may be one-dimensional barcodes, two-dimensional barcodes, or other kinds of barcodes. In this disclosure, the term "barcode" broadly refers to any machine-readable symbology for encoding data. According to an embodiment of the present invention, three or more barcode stamps are printed on a hardcopy document as registration markers. The hardcopy document bearing the barcode stamps is then released for circulation, during which it may be copied, etc. Then, a hardcopy of the document (still bearing the barcode stamps) is scanned back for authentication. During the authentication process, the barcode stamps are used to perform image registration.

One advantage of using barcode stamps as registration markers is to avoid adding extra markers such as crosshairs, etc. on the printed document, as barcodes are already being printed on the document for purposes of encoding information.

Embodiments of the present invention use a simple and fast algorithm to perform resizing and deskew. Conventional deskew methods, such as Fourier-Mellon transform or Hough transform, applied to the entire image, are either content dependent or slow. According to embodiments of the present invention, only a single linear equation needs to be solved for both deskew and resize, thereby offering high performance.

Figure 1:
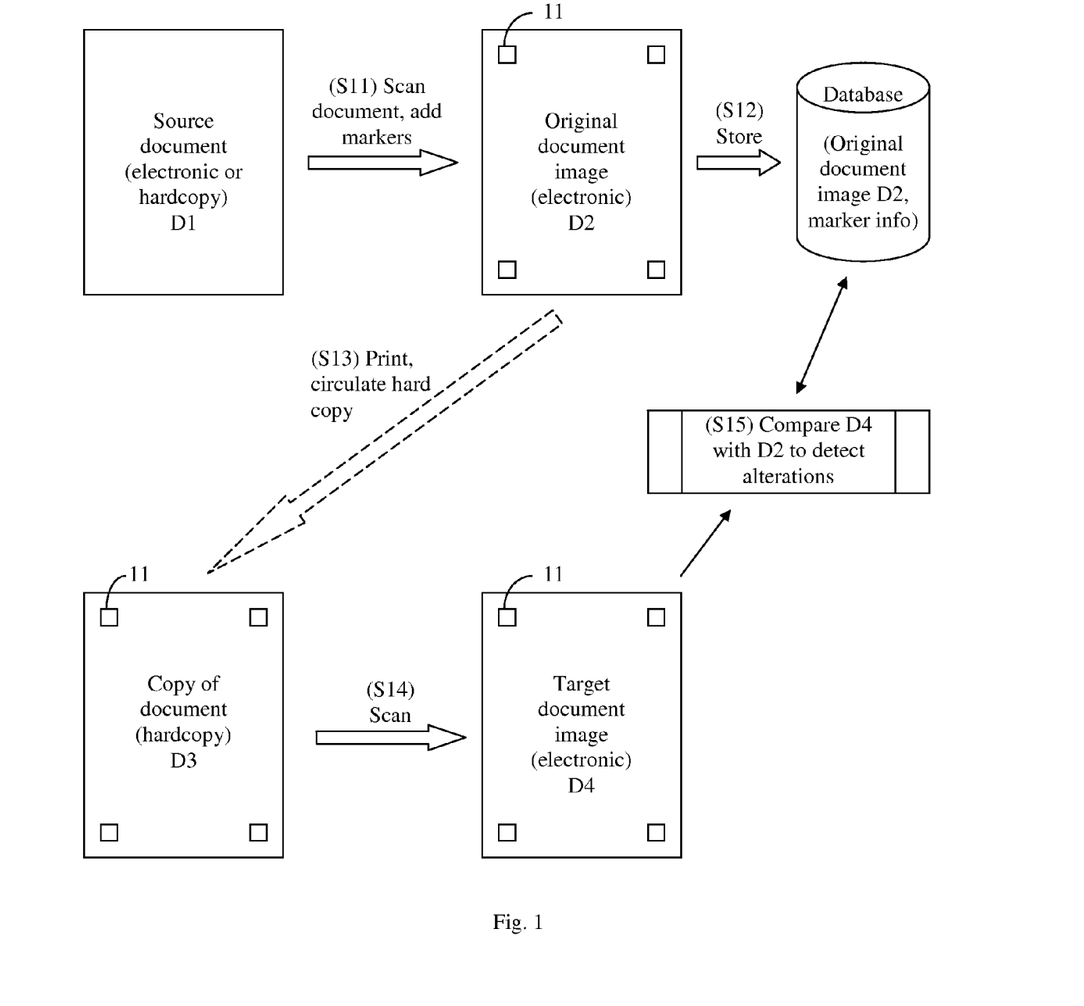
FIG. 1 schematically illustrates a method of adding markers to a document before printing for the purpose of document authentication by image comparison according to an embodiment of the present invention.

FIG. 1 illustrates a "closed-loop" print and scan process for a document. A source version of the document, D1, may be either a hardcopy document of an electronic document such as a Word file, a PDF file, etc. The source document D1 is processed (including converting into electronic form if necessary) to generate an electronic document image, referred to as the original document image D2, by adding three or more alignment markers 11 (step S11). As described above, the markers 11 are preferably barcode stamps. The multiple barcode stamps may encode the same or different information. The alignment markers are preferably added near the corners of the document page or the original image. In a preferred embodiment, four alignment markers are located near the four corners of the boundary of the entire image, such as within 1 inch in the horizontal and vertical directions of the corners. In addition, document management information, such as where the document D2 is stored, is also added to the original document image D2 to assist in document identification later on. The document management information may be encoded in the barcode stamps that are used as markers, or encoded in other barcode stamps added to the document image, or added to the document by other means such as a text footer, etc. The original document image D2 is stored in a database for later use (step S12).

Preferably, information about the markers, such as the type of the barcode stamps, their locations and sizes, etc., is also stored in the database and preferably associated with the original document image D2.

The original document image D2 is then printed and the printed hardcopy document is distributed and circulated, during which the printed document may be copied (step S13). Later, a hardcopy document D3, which purports to be an authentic hardcopy of the original document D2, is submitted for authentication. The first step of the authentication process is to convert the hardcopy document D3 into an electronic document image, referred to as the target document image D4, by scanning or other methods (step S14). The target document image D4 is then compared to the original document image D2 stored in the database to detect alterations (step S15), as shown in more detail in FIG. 2.

In FIG. 1, the steps S11 and S12 may be performed by a computer or other suitable data processing apparatus; a scanner or an all-in-one device (a device that combines a printing section and scanning section in a single device) connected to the computer may be used to perform the scanning part of step S11. The printing step S13 may be performed by printer or an all-in-one device connected to a computer or other suitable data processing apparatus which has access to the database. The database may be implemented by a mass storage device connected to the computer by suitable means. The step S15 (i.e. the process of FIG. 2) may be performed by a computer or other suitable data processing apparatus connected to the database. The step S14 may be performed by a scanner connected to a computer. The above computers may be the same or different computers. The computers execute appropriate software programs stored in memories of the computers to perform the respective processes.

Figure 2:
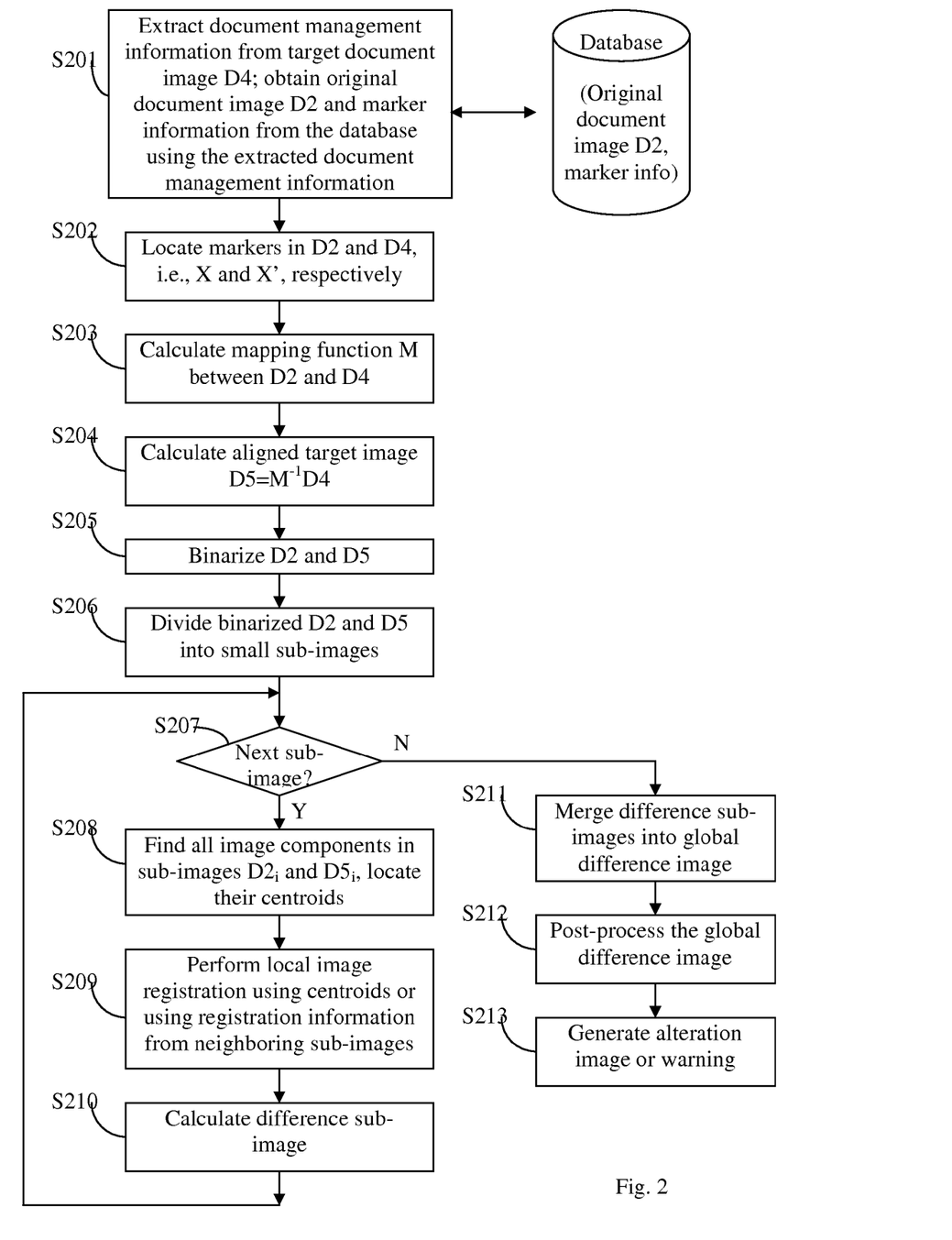
FIG. 2 schematically illustrates a method for document authentication according to an embodiment of the present invention.

In the authentication process, as illustrated in FIG. 2, the original document image D2 is retrieved from the database (step S201). This is accomplished by first extracting document management information from the target document image D4, and then using the extracted document management information to retrieve the correct document from the database. As described above, document management information may be encoded in barcode stamps 11 used as markers, or in other barcode stamps in the document D4, or by other means. Many techniques for recognizing barcodes in a document image and extracting the encoded information are well known, and any suitable techniques may be employed in this step.

Next, the program locates markers in the original document image D2 and the target document image D4 (step S202). If marker information has been stored in the database and is obtained in step S201, it can be used to assist in locating the markers. For example, the marker information may specify that four barcode stamps have been added near the four corners of the page, the location of the stamps, the size of the stamps, etc. Using this information, the markers may be more easily located in images D2 and D4. Any suitable techniques, such as template matching, may be used to locate the markers. If no independent marker information is available from the database, the markers may be located by comparing similar patterns in the images D2 and D4 in areas near the corners of the page (i.e. within 1 inch from the corners in the horizontal and vertical directions).

More specifically, two scenarios may be commonly encountered in performing steps S201 and S202. In the first, the document management information is encoded by means other than the barcode markers. In this case, the document management information is obtained independent of the barcode marker and used to access the database (step S201). Relevant marker information is also obtained from the database. Then, in step S202, the barcode markers are located in images D2 and D4 using the information obtained from the database.

In the second scenario, the document management information necessary for accessing the database is only encoded in the barcode markers. Thus, step S201 includes locating and decoding the barcode markers in image D4 to obtain the document management information for accessing the database. Even in such a case, it is not necessary to know the exact marker locations beforehand to decode the barcode makers. It may be assumed that the barcode markers are located within a certain range of locations in the scanned image (for example, with certain distances from the corners) and a search method may be used to locate the markers. The barcode markers can also be located and decoded simultaneously by using known barcode recognition methods. If the image D4 is skewed and the barcode recognition method requires deskewed input, sub-images that contain the barcodes may be rotated using a trial-and-error type method before the image is feed into the recognition module until the barcodes are recognized. In this case, step S202 may include obtaining the accurate marker locations in images D2 and D4 using the database information. In either scenario, steps S201 and S202 collectively achieve the result of obtaining accurate locations of the barcode markers in images D2 and D4.

Then, a global mapping function M between images D2 and D4 is calculated using the positions of the markers (step S203). The following descriptions use an example where four markers have been located in each of D2 and D4, where markers 1, 2, 3, 4 are located near the upper-left hand, upper-right hand, lower-left hand and lower-right hand corners, respectively. The coordinates of the markers are (x1,y1), (x2, y2), (x3,y3) and (x4,y4) for D2, and (x1',y1'), (x2',y2'), (x3', y3') and (x4',y4') for D4, and collectively X and X', respectively. Any predetermined location of each marker can be used as the marker's position, such as the centers of the markers, a particular corner of the markers when the markers are rectangular barcode stamps, etc.

First, a vertical scaling factor $m_V$ and a horizontal scaling factor $m_H$ are calculated from X and X' as follows:

$$m_v = \frac{1}{2} \times \left( \frac{\sqrt{(x3'-x1')^2 + (y3'-y1')^2}}{\sqrt{(x3-x1)^2 + (y3-y1)^2}} + \frac{\sqrt{(x4'-x2')^2 + (y4'-y2')^2}}{\sqrt{(x4-x2)^2 + (y4-y2)^2}} \right) \quad \text{(Eq. 1)}$$

-continued $$m_H = \frac{1}{2} \times \left( \frac{\sqrt{(x2'-x1')^2 + (y2'-y1')^2}}{\sqrt{(x2-x1)^2 + (y2-y1)^2}} + \frac{\sqrt{(x4'-x3')^2 + (y4'-y3')^2}}{\sqrt{(x4-x3)^2 + (y4-y3)^2}} \right) \quad \text{(Eq. 2)}$$

Of course, other effective equations may be used to calculate the scaling factors.

A rotation angle θ between the two images D4 and D2 can be estimated using the following equation $$\theta = \tan^{-1}((y2'-y1')/(x2'-x1')) \quad \text{(Eq. 3)}$$

or using similar equations using other marker pairs in the target image D4, or by averaging multiple calculated values. The above equation assumes that the four markers in the original image D2 are aligned vertically and horizontally, i.e., x1=x3, x2=x4, y1=y2 and y3=y4. If they are not aligned vertically and horizontally, then equation 3 should be changed accordingly.

Vertical and horizontal shift amounts between the two images can be estimated using the following equation:

$$\begin{cases} x0 = x1' - x1 \\ y0 = y1' - y1 \end{cases} \quad \text{(Eq. 4)}$$

In matrix expression, the mapping function M between the target image D4 and the original image D2 can be obtained by the following method:

$$\begin{pmatrix} x1+x0 & y1+y0 \\ x2+x0 & y2+y0 \\ x3+x0 & y3+y0 \\ x4+x0 & y4+y0 \end{pmatrix} \begin{pmatrix} m_H\cos\theta & m_H\sin\theta \\ -m_v\sin\theta & m_v\cos\theta \end{pmatrix} = \begin{pmatrix} x1' & y1' \\ x2' & y2' \\ x3' & y3' \\ x4' & y4' \end{pmatrix} \quad \text{(Eq. 5)}$$

or $$(X + X0)M = X' \quad \text{(Eq. 6)}$$

where X, X' and X0 are the coordinates to the markers and the shift amounts expressed in matrix form. Therefore M is obtained from $$M = (X^T(X+X0))^{-1}X^TX' \quad \text{(Eq. 7)}$$

Because there are three unknowns in M, the equation Eq. 5 is over-determined, and suitable mathematically techniques can be used to obtain the best estimate for $m_V$, $m_H$ and θ. In other words, the minimum number of markers required to solve the mapping function M is three, and when more than three markers are used, there is a built-in redundancy which improves reliability and accuracy.

Of course, the calculation of the mapping function M is not limited to the algorithms described above and other algorithms can be used.

Once the mapping function M is obtained, an aligned target image D5 can be calculated as follows (step S204):

$$D5 = M^{-1}D4 \quad \text{(Eq. 8)}$$

The mapping function M described above is a linear mapping and can be calculated from X and X' in a number of ways in addition to the calculation described above.

Once the aligned target image D5 is obtained, only the image areas within the markers in images D2 and D5 are considered in subsequent processes. The two image areas within the markers have the same dimensions.

Figure 3:
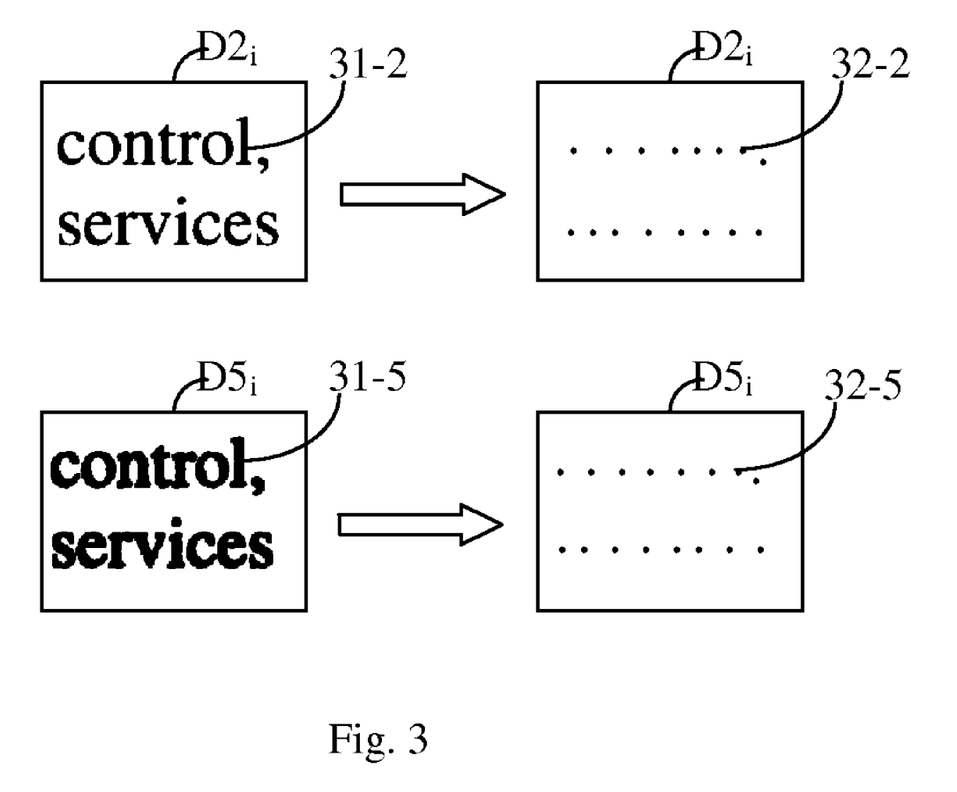
FIG. 3 schematically illustrates two exemplary sub-images each containing a number of image components and the centroids corresponding to the image components.

In the method shown in FIG. 2, steps S202 to S204 described above accomplish a global image registration (alignment) sub-process. After global registration, the two images D2 and D5 are binarized (step S205). Then, the binarized images D2 and D5 are each divided into a plurality of small sub-images $D2_i$ and $D5_i$ for image comparison. The sub-images may have a size of, for example, 64 by 64 pixels, 128 by 128 pixels, or other suitable sizes. For each original sub-image $D2_i$ and the corresponding target sub-image $D5_i$ (step S207), connected image components with the sub-image are identified, and their centroids (geometric center) are calculated (step S208). In a binary image, connected image components are connected groups of pixels. In a text document, for example, each alphabetic character typically forms one or two connected image components. FIG. 3 schematically illustrates two sub-images $D2_i$ and $D5_i$ each containing a number of image components 31-2 and 31-5, and the centroids 32-2 and 32-5 corresponding to the image components. Many methods for extracting connected image components are known; any suitable method may be employed in this step. As a result of step S207, each sub-image $D2_i$ and $D5_i$ will contain a set of centroids.

The two sets of centroids 32-2 and 32-5 in the two sub-images $D2_i$ and $D5_i$ are used to perform local registration for the two sub-images (step S209). Similar to the global image registration process, the local image registration includes obtaining a local mapping function M, between the two sub-images which corrects for scaling, rotation and/or shift. An algorithm similar to Eq. 5 described above may be used to calculate the local mapping function, with the coordinates of the markers replaced by coordinates of the centroids. Once the local mapping function $M_i$ is obtained, the target sub-image $D5_i$ can be corrected using an equation similar to Eq. 8 above to obtain an aligned sub-image $D6_i$ (step S209).

Of course, the sets of centroids 32-5 in the target image may not exactly correspond to the set of centroids 32-2 in the original image. For example, the target image may have missing or extraneous centroids, which would in itself indicate alteration of the document. Only corresponding ones in the two sets of centroids should be used in calculating the local mapping function. A minimum of three independent centroids (in other words, the centroids are not collinear) is required to calculate a local mapping function. Further, the two sets of centroids may not correspond to each other at all if the target sub-image contains completely altered content. In such a situation, local registration would be unnecessary.

Other methods may also be used to perform local registration. For example, if scaling and rotation are not a major concern, a cross correlation method can be used in lieu of centroid mapping. Cross correlation, which involves calculating the cross correlation of the two bitmaps of the sub-images $D2_i$ and $D5_i$ can correct for shifting of the images. As another alternative, centroid mapping can be performed first, and then cross correlation can be performed on the rotated/scaled/shifted sub-images.

In a situation where the sub-image does not contain a sufficient number of connected components for calculating centroids, for example, when the sub-image contains only bitmap images or graphics objects, the local registration step S209 may be performed by using a mapping function (scaling, rotation and shift) obtained from one or more neighboring sub-images as an estimated mapping function.

An advantage of a two-step image registration, which combines a first step of global image registration and a second step of local image registration, is that it can reduce some of the impact of non-linear distortions in the target image. For example, different parts of the image may have different amounts of rotation or scaling. In such a case, local registration can correct for remaining distortion in each sub-image that is not corrected by the global registration.

After local registration, the sub-image images $D2_i$ and $D6_i$ are compared to generate a difference sub-image (step S210). A difference map of two binary bitmaps is the binary difference ("XOR") of the two bitmaps. Steps S208 to S210 are repeated for the next sub-image until all sub-images are processed ("N" in step S207). Then, the difference sub-images are merged into a global difference image (step S211), and post-processing is carried out on the global difference image (step S212). One example of post-processing is described below; a similar process is described in commonly-owned, co-pending U.S. patent application Ser. No. 12/495,749, filed Jun. 30, 2009, [BIL-295].

First, an edge map is computed from the original image D2 or the aligned target images D5. An edge map is a binary map that represents the shape of edges of connected image components. The pixel values in the edge map represent whether the pixel is in an edge area of a connected image component. Any suitable edge detection (edge extraction) method may be used to generate the edge map, such as Laplacian of Gaussian or Canny edge detectors. Some of such edge detectors generate edges that are approximately one pixel wide. The width of the edges generated by an edge detector may be expanded (e.g. from single pixel to multiple pixels) using morphological dilation. Next, the difference map generated in step S211 is modified to remove any difference pixels that fall in the edge area of the edge map. Preferably, a de-noise step is also performed on the difference image to remove small components.

The post-processing steps described above may alternatively be performed on the difference images for each sub-image rather than for the global difference image.

An alteration map of the document may be generated from the post-processed difference image to indicate the detected alterations (step S213). The alteration map may be printed, displayed on a display device such as a computer monitor, stored in electronic form, etc. The alteration map may have any suitable format as long as it can indicate the alterations (differences) between the original and target images. For example, the alteration map may be a binary difference map indicating which pixels are different between the two images. In such a map, unaltered areas will be blank, and altered areas will appear on the map. As another example, the alteration map may be a marked-up version of the original image or a marked-up version of the target image, with markers or highlights (such as boxes, circles, lines, arrows, colors, etc.) to indicate parts of the image that are altered (added, deleted, changed, etc.). Different colors may be used in the alteration map to indicate different types of alterations (additions, deletions, changes, etc.). In another example, the alteration map may include only markers indicating the location of the alterations without including any image components. As an alternative to generating an alteration It will be apparent to those skilled in the art that various modification and variations can be made in the alteration detection method and related apparatus of the present invention without departing from the spirit or scope of the invention. Thus, it is intended that the present invention cover modifications and variations that come within the scope of the appended claims and their equivalents.

What is claimed is:

1. A method implemented in a data processing system, comprising:
   (a) generating an electronic original document image based on a source document, wherein the original document image includes an image representing the source document and at least three alignment markers, wherein each alignment marker is a barcode stamp and is located within a predefined distance from a corresponding one of at least three corners of a boundary of the original document image;
   (b) storing the original document image in a database;
   (c) printing the original document image to generate a printed document, whereby the printed document bears the at least three alignment markers;
   (d) obtaining an electronic target document image from the printed document or a copy thereof, whereby the target document image contains the at least three alignment markers;
   (e) extracting document management information from the target document image, the document management information specifying a location within the database where the original document image is stored;
   (f) retrieving the original document image from the database based on the extracted document management information;
   (g) obtaining positions of the at least three alignment markers in the target document image;
   (h) obtaining positions of the at least three alignment markers in the original document image;
   (i) calculating a global mapping function between the original document image and the target document image using the positions of the alignment markers in the original document image and the target document image; and
   (j) calculating an aligned target document image using the target document image and the mapping function.

2. The method of claim 1, wherein the original document image includes four alignment markers each located within a predefined distance from a corresponding one of four corners of the boundary of the image.

3. The method of claim 1, wherein the barcode stamps encode the document management information, and wherein step (e) includes decoding the barcode stamps to obtain the document management information.

4. The method of claim 1, wherein the original document image further includes the document management information separate from the barcode stamps.

5. The method of claim 1,
   wherein step (b) further includes storing marker information in the database associated with the original document image, the marker information specifying a type, location and size of each barcode stamp,
   wherein step (f) further includes retrieving the marker information from the database, and
   wherein in steps (g) and (h) the positions of the alignment markers are obtained using the retrieved marker information.

6. The method of claim 1, wherein the global mapping function corrects for image scaling, rotation and shift in the target document image.

7. The method of claim 1, further comprising:
   (k) binarizing the original document image and the aligned target document image to generate a binarized original document image and a binarized target document image;
   (l) dividing the binarized original document image into a plurality of original sub-images and dividing the binarized target document image into a plurality of target sub-images corresponding to the plurality of original sub-images;
   (m) for each original sub-image and the corresponding target sub-image,
      (m1) obtaining positions of a plurality of centroids for a plurality of connected image components in each sub-image;
      (m2) calculating a local mapping function between the original sub-image and the target sub-image using the positions of the plurality of centroids in the original sub-image and the target sub-image;
      (m3) calculating an aligned target sub-image using the target sub-image and the local mapping function; and
      (m4) calculating a difference sub-image representing differences between the aligned target sub-image and the original sub-image; and
   (n) merging the difference sub-images to generate a global difference image representing differences between the target document image and the original document image.

8. A method for authenticating a printed document, the printed document containing at least three alignment markers, the method comprising:
   (a) obtaining an electronic target document image from the printed document, whereby the target document image contains the at least three alignment markers;
   (b) extracting document management information from the target document image, the document management information specifying a location within a database where an original document image corresponding to the target document image is stored;
   (c) retrieving the original document image from the database based on the extracted document management information, wherein the original document image contains at least three alignment markers corresponding to the at least three alignment markers in the target document image;
   (d) obtaining positions of the at least three alignment markers in the target document image;
   (e) obtaining positions of the at least three alignment markers in the original document image;
   (f) calculating a global mapping function between the original document image and the target document image using the positions of the alignment markers in the original document image and the target document image; and
   (g) calculating an aligned target document image using the target document image and the mapping function;
   (h) binarizing the original document image and the aligned target document image to generate a binarized original document image and a binarized target document image;
   (i) dividing the binarized original document image into a plurality of original sub-images and dividing the binarized target document image into a plurality of target sub-images corresponding to the plurality of original sub-images;
   (j) for each original sub-image and the corresponding target sub-image,
      (j1) aligning the target sub-image to the original sub-image to generate an aligned target sub-image; and
      (j2) calculating a difference sub-image representing differences between the aligned target sub-image and the original sub-image; and
   (k) merging the difference sub-images to generate a global difference image representing differences between the target document image and the original document image.

9. The method of claim 8, wherein step (j1) comprises:
obtaining positions of a plurality of centroids for a plurality of connected image components in each sub-image;
calculating a local mapping function between the original sub-image and the target sub-image using the positions of the plurality of centroids in the original sub-image and the target sub-image; and
calculating the aligned target sub-image using the target sub-image and the local mapping function.

10. A computer program product comprising a computer usable, non-transitory medium having a computer readable program code embedded therein for controlling a data processing apparatus, the computer readable program code configured to cause the data processing apparatus to execute a process which comprises:
(a) generating an electronic original document image based on a source document, wherein the original document image includes an image representing the source document and at least three alignment markers, wherein each alignment marker is a barcode stamp and is located within a predefined distance from a corresponding one of at least three corners of a boundary of the original document image;
(b) storing the original document image in a database;
(c) printing the original document image to be printed to generate a printed document, whereby the printed document bears the at least three alignment markers;
(d) obtaining an electronic target document image from the printed document or a copy thereof, whereby the target document image contains the at least three alignment markers;
(e) extracting document management information from the target document image, the document management information specifying a location within the database where the original document image is stored;
(f) retrieving the original document image from the database based on the extracted document management information;
(g) obtaining positions of the at least three alignment markers in the target document image;
(h) obtaining positions of the at least three alignment markers in the original document image;
(i) calculating a global mapping function between the original document image and the target document image using the positions of the alignment markers in the original document image and the target document image; and
(j) calculating an aligned target document image using the target document image and the mapping function.

11. The computer program product of claim 10, wherein the original document image includes four alignment markers each located within a predefined distance from a corresponding one of four corners of the boundary of the image.

12. The computer program product of claim 10, wherein the barcode stamps encode the document management information, and wherein step (e) includes decoding the barcode stamps to obtain the document management information.

13. The computer program product of claim 10, wherein the original document image further includes the document management information separate from the barcode stamps.

14. The computer program product of claim 10,
wherein step (b) further includes storing marker information in the database associated with the original document image, the marker information specifying a type, location and size of each barcode stamp,
wherein step (f) further includes retrieving the marker information from the database, and
wherein in steps (g) and (h) the positions of the alignment markers are obtained using the retrieved marker information.

15. The computer program product of claim 10, wherein the global mapping function corrects for image scaling, rotation and shift in the target document image.

16. The computer program product of claim 10, wherein the process further comprises:
(k) binarizing the original document image and the aligned target document image to generate a binarized original document image and a binarized target document image;
(l) dividing the binarized original document image into a plurality of original sub-images and dividing the binarized target document image into a plurality of target sub-images corresponding to the plurality of original sub-images;
(m) for each original sub-image and the corresponding target sub-image,
(m1) obtaining positions of a plurality of centroids for a plurality of connected image components in each sub-image;
(m2) calculating a local mapping function between the original sub-image and the target sub-image using the positions of the plurality of centroids in the original sub-image and the target sub-image;
(m3) calculating an aligned target sub-image using the target sub-image and the local mapping function; and
(m4) calculating a difference sub-image representing differences between the aligned target sub-image and the original sub-image; and
(n) merging the difference sub-images to generate a global difference image representing differences between the target document image and the original document image.

17. A computer program product comprising a computer usable, non-transitory medium having a computer readable program code embedded therein for controlling a data processing apparatus, the computer readable program code configured to cause the data processing apparatus to execute a process for authenticating a printed document, the printed document containing at least three alignment markers, the process comprising:
(a) obtaining an electronic target document image from the printed document, whereby the target document image contains the at least three alignment markers;
(b) extracting document management information from the target document image, the document management information specifying a location within a database where an original document image corresponding to the target document image is stored;
(c) retrieving the original document image from the database based on the extracted document management information, wherein the original document image contains at least three alignment markers corresponding to the at least three alignment markers in the target document image;
(d) obtaining positions of the at least three alignment markers in the target document image;
(e) obtaining positions of the at least three alignment markers in the original document image;
(f) calculating a global mapping function between the original document image and the target document image using the positions of the alignment markers in the original document image and the target document image; and
(g) calculating an aligned target document image using the target document image and the mapping function;

(h) binarizing the original document image and the aligned target document image to generate a binarized original document image and a binarized target document image;

(i) dividing the binarized original document image into a plurality of original sub-images and dividing the binarized target document image into a plurality of target sub-images corresponding to the plurality of original sub-images;

(j) for each original sub-image and the corresponding target sub-image,

(j1) aligning the target sub-image to the original sub-image to generate an aligned target sub-image; and     (j2) calculating a difference sub-image representing differences between the aligned target sub-image and the original sub-image; and (k) merging the difference sub-images to generate a global difference image representing differences between the target document image and the original document image.

18. The computer program product of claim 17, wherein step (j1) comprises:

obtaining positions of a plurality of centroids for a plurality of connected image components in each sub-image;

calculating a local mapping function between the original sub-image and the target sub-image using the positions of the plurality of centroids in the original sub-image and the target sub-image; and calculating the aligned target sub-image using the target sub-image and the local mapping function.

\* \* \* \* \*